United States Patent
Chen

(10) Patent No.: US 6,920,310 B2
(45) Date of Patent: Jul. 19, 2005

(54) METHOD FOR WARNING ABNORMAL CONNECTION BETWEEN TWO BLUETOOTH DEVICES

(75) Inventor: James Chen, Hsinchu (TW)

(73) Assignee: Lite-on Technology Corp., Taipei (TW)

( * ) Notice: Subject to any disclaimer, the term of this patent is extended or adjusted under 35 U.S.C. 154(b) by 429 days.

(21) Appl. No.: 10/093,693

(22) Filed: Mar. 11, 2002

(65) Prior Publication Data

US 2003/0137414 A1 Jul. 24, 2003

(30) Foreign Application Priority Data

Jan. 18, 2002 (TW) ........................................ 91100778 A
Jan. 18, 2002 (TW) ........................................ 91100779 A

(51) Int. Cl.[7] ................................................ H04B 5/00
(52) U.S. Cl. .................... 455/41.1; 455/41.2; 455/41.3; 455/456.1; 455/456.2; 455/457
(58) Field of Search ............................. 455/41.1, 41.2, 455/41.3, 456.1, 456.2, 457

(56) References Cited

U.S. PATENT DOCUMENTS 5,749,367 A * 5/1998 Gamlyn et al. ............ 600/509
6,484,080 B2 * 11/2002 Breed .......................... 701/36
6,580,372 B1 * 6/2003 Harris ...................... 340/686.6
2002/0162011 A1 * 10/2002 Tanaka et al. .............. 713/200
2004/0203465 A1 * 10/2004 Goldstein et al. ........ 455/67.13

* cited by examiner

*Primary Examiner*—Lee Nguyen
*Assistant Examiner*—Minh D Dao
(74) *Attorney, Agent, or Firm*—Bacon & Thomas, PLLC

(57) ABSTRACT

A method for warning abnormal connection between two bluetooth devices allows a user to adjust a distance between two connected bluetooth devices and to take an average obtained from several quality values read at that distance as a comparison value. Thereafter, a CPU of any one of the devices gets link quality value periodically by a host controller interface (HCI) command. The CPU will send out a warning message to mention the user of the bluetooth device when the quality value is lower than the comparison value, i.e. the connection is abnormal. And then, the user can handle it immediately, for example, pulls the two devices closer to lower the probability of the connection termination. The invention can reach the abnormal connection warning requirements for different users, and allows different users to have abnormal connection warning establishment for different distances.

9 Claims, 3 Drawing Sheets

METHOD FOR WARNING ABNORMAL CONNECTION BETWEEN TWO BLUETOOTH DEVICES

BACKGROUND OF THE INVENTION

The invention relates to a method for warning abnormal connection between two bluetooth devices, and more particularly to a method using a HCI command sent out from a CPU of a bluetooth device to get a connection quality value periodically in order to realize-evaluate the connection situation.

Bluetooth technology whose development started at the beginning of the year 1998 is popularized by Bluetooth Special Interest Group and is a low power radio technology. It can replace cable used in connecting with most portable devices such as PDA and cellular phone, PC, printer and etc in order to allow usable spaces of these devices to be clear owing to reduction in complex lines connection.

But, a general bluetooth device gives no warning when an abnormal connection happens; a user usually doesn't discern the abnormal connection until the connection is interrupted. Therefore, a user must spend a great amount of time and energy to rebuild the connection between them at that time, and if it happens often, the waste of time and energy will be multiply increased. However, the user can take measures to prevent the abnormal connection from happening if he knows that the abnormal connection will happen later in advance.

SUMMARY OF THE INVENTION

The main object of the invention is to provide a method for warning abnormal connection between two bluetooth devices, enabling a HCI (Host Controller Interface) command sent out from a CPU of a bluetooth device to check the link quality value periodically after the connection between a bluetooth device and another is built.

Another object of the invention is to provide a method for warning abnormal connection between two bluetooth devices; a CPU of a bluetooth device can emit a warning message (such as vibration, sound bell or screen display and etc) to notify the bluetooth device user when a checked quality value is lower than a comparison value.

Another object of the invention is to provide a method for warning abnormal connection between two bluetooth devices, enabling a user to handle an abnormal connection (for example, shorten the distance between two bluetooth devices) in time by providing the user a warning message in order to reduce the probability of a connection interruption.

Another object of the invention is to provide a method for warning abnormal connection between two bluetooth devices, enabling a CPU of a bluetooth device to stop emitting warning message when a quality value is recovered to be higher than a comparison value.

Another object of the invention is to provide a method for warning abnormal connection between two bluetooth devices, allowing a user to adjust the distance between these two connected bluetooth devices and to take an average value of a plurality of quality values read at that distance as a comparison value in order to suit different users with different requirements for abnormal connection warning, i.e. to let different users have different abnormal connection warning set-ups at the different distance.

BRIEF DESCRIPTION OF THE DRAWINGS

Other objects, features, and advantages of the invention will become apparent from the following detailed description of the preferred but non-limiting embodiments. The description is made with reference to the accompanying drawings in which.

DETAILED DESCRIPTION OF THE INVENTION

Figure 1:
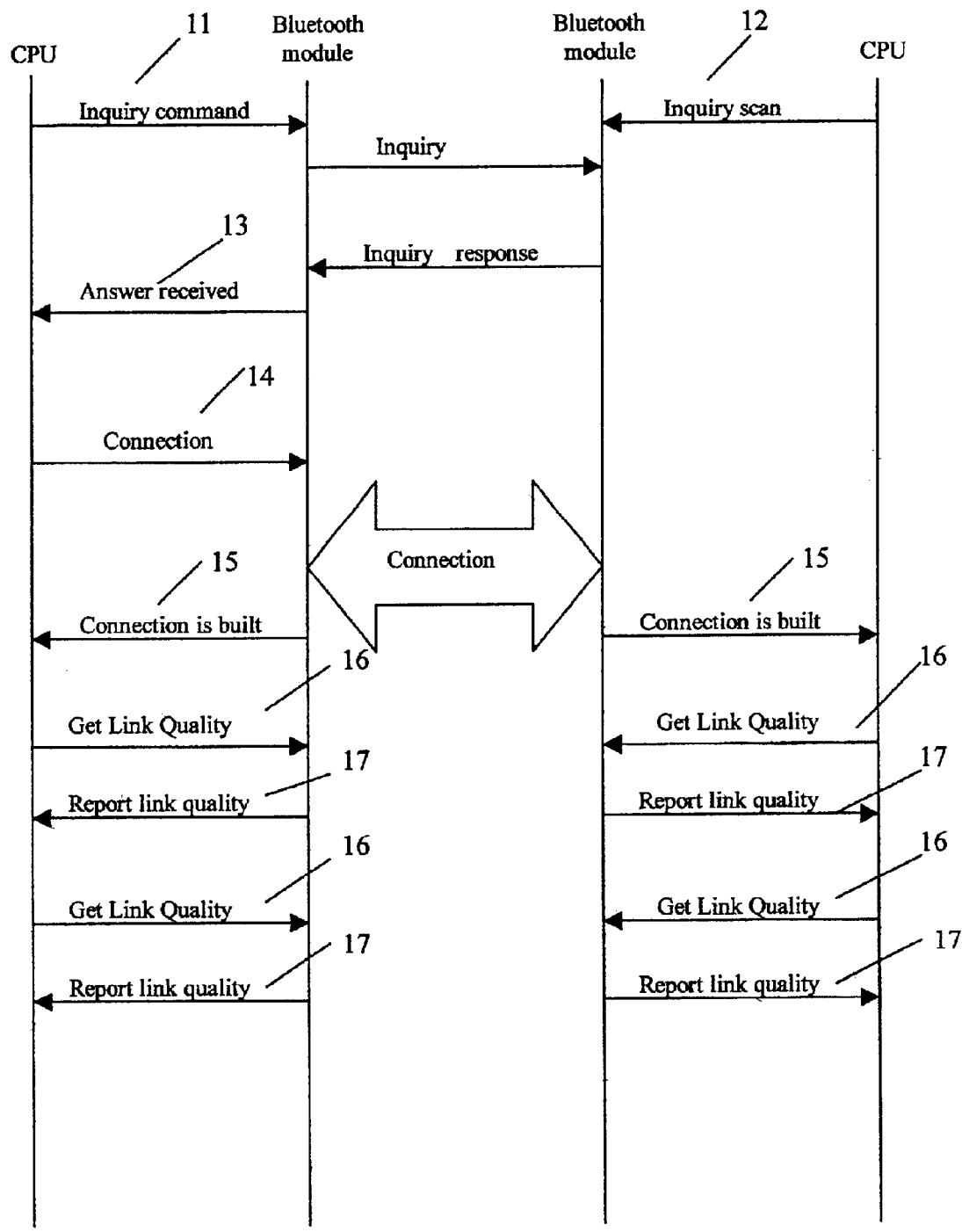
FIG. 1 is a flow chart of a preferred embodiment of the present invention, illustrating steps for getting a connection quality value after a connection is built between two bluetooth devices.

First, please refer to FIG. 1. The figure shows how to check a connection quality value after the connection of two bluetooth devices is built. As the figure shows, one of the two bluetooth devices emits a inquiry command from a CPU thereof through a bluetooth module (step 11) to the bluetooth module of another bluetooth device, a CPU of the another bluetooth device will process an inquiry scan after receiving the command (step 12). The bluetooth module will send back an answer-receiving message to the CPU after the bluetooth device that emits the inquiry command receives an inquiry response from the another bluetooth device (step 13), the CPU soon sends a connection-building command to the bluetooth module (step 14), the bluetooth module informs the CPU that the connection is built after receiving the command (step 15).

The CPU of any one of the bluetooth devices sends out an HCI (Host Controller Interface) command periodically to the bluetooth device to get link quality value after the connection between the bluetooth devices is built (step 16). Next, the bluetooth module reports the link quality value to the CPU after receiving the command (step 17). Therefore, repeating the steps 16 and 17 periodically can get the link quality value anytime. The HCI mentioned above is the interface between a controller of a bluetooth device and bluetooth chip module and is used to transmit data or commands between them, and the HCI command mentioned above is a command sent out by a controller of a bluetooth device to control a bluetooth chip module. The HCI and corresponding HCI command to get link quality value are familiar to persons skilled in this art.

Figure 2:
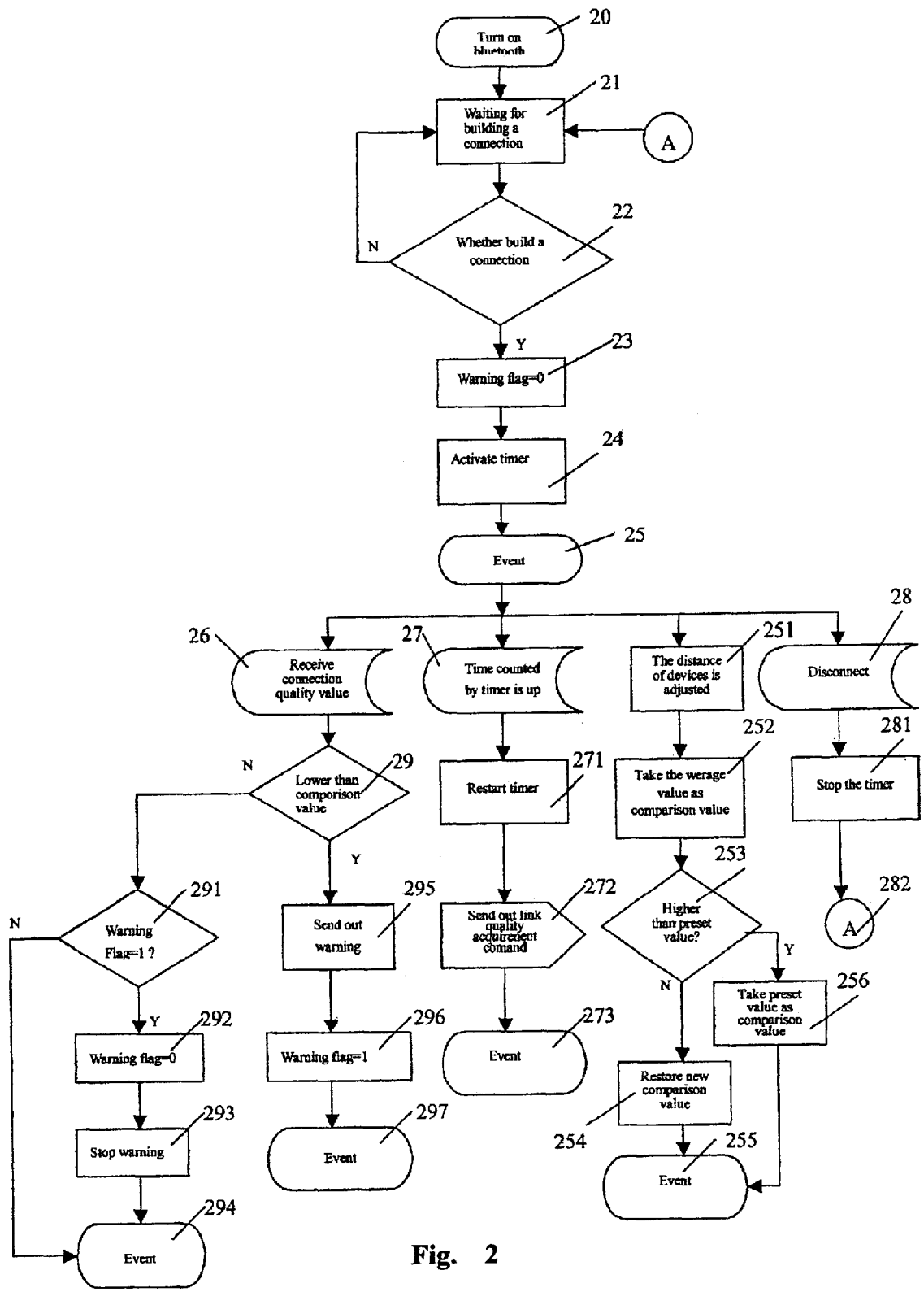
FIG. 2 is a flow chart, illustrating steps for controlling an abnormal connection warning of a bluetooth device.

Please refer to FIG. 2. The figure shows a flow chart for software control. As the figure shows, after the bluetooth device is turned on (step 20), it waits to build a connection with another bluetooth device (step 21). After that, check whether the connection with other devices is built or not (step 22), if the connection is still not built, then go back to the step 21 to continue to confirm the establishment of the connection; if the establishment of the connection with another bluetooth device is done, then set the warning flag to be 0 (it represents that the connection is built and abnormality is not yielded) (step 23). A link quality acquirement timer can be started at that time (step 24), then wait for an event (step 25).

After the event waiting (step 25), there are four situations may happen: first, receive the link quality value (step 26), and the CPU will judge whether it is lower than a comparison value or not (step 29). If the quality value is not lower than the comparison value (i.e. abnormality is not yielded or abnormality is excluded), confirm again whether the warning flag is 1 or not at that time (i.e. whether a warning message is emitting) (step 291), if the answer is not, it means that the device is not in the middle of warning, enter event waiting directly (step 294); if the warning flag is 1 (i.e. abnormality is yielded before and excluded at the present), set the warning flag back to 0 (step 292), stop warning (step 293), then enter event waiting directly (step 294). In the step 29 mentioned above, if that the connection quality value is lower than the comparison value is judged, abnormal connection will happen, therefore, a warning device will send out warning (step 295) and the warning flag is set to be 1 (step 296), then enter event waiting state (step 297).

The second situation is when the link quality acquirement timer is up (step 27), the timer must be restarted (step 271), send out a link quality acquirement command again (step 272), and then enter event waiting (step 273). These steps can attain the effect of a periodic link connection acquirement value.

The third situation relates to the establishment of a comparison value. First, a user adjusts the distance between two bluetooth devices (step 251), wherein the distance can be adjusted to be an expected farthest warning distance. Take the average value of several link quality values read at the distance to be a comparison value (step 253). And then, judge whether the comparison value got from the steps mentioned above is higher than a preset value (step 253), here, this preset value can be the highest preset value. If the comparison is higher than the preset value, then take the preset value as the comparison (step 256) and enter event waiting state (step 255); if the comparison value is not higher than the preset value, replace the comparison value stored previously with the comparison value mentioned above (step 254), then enter event waiting state (step 255), thus, the whole establishment of the comparison value is completed.

The last situation is that when the connection between bluetooth devices will be disconnected (step 28), stop the timer (step 281) and wait for inquiring to build up a connection with another bluetooth device (step 282).

Figure 3:
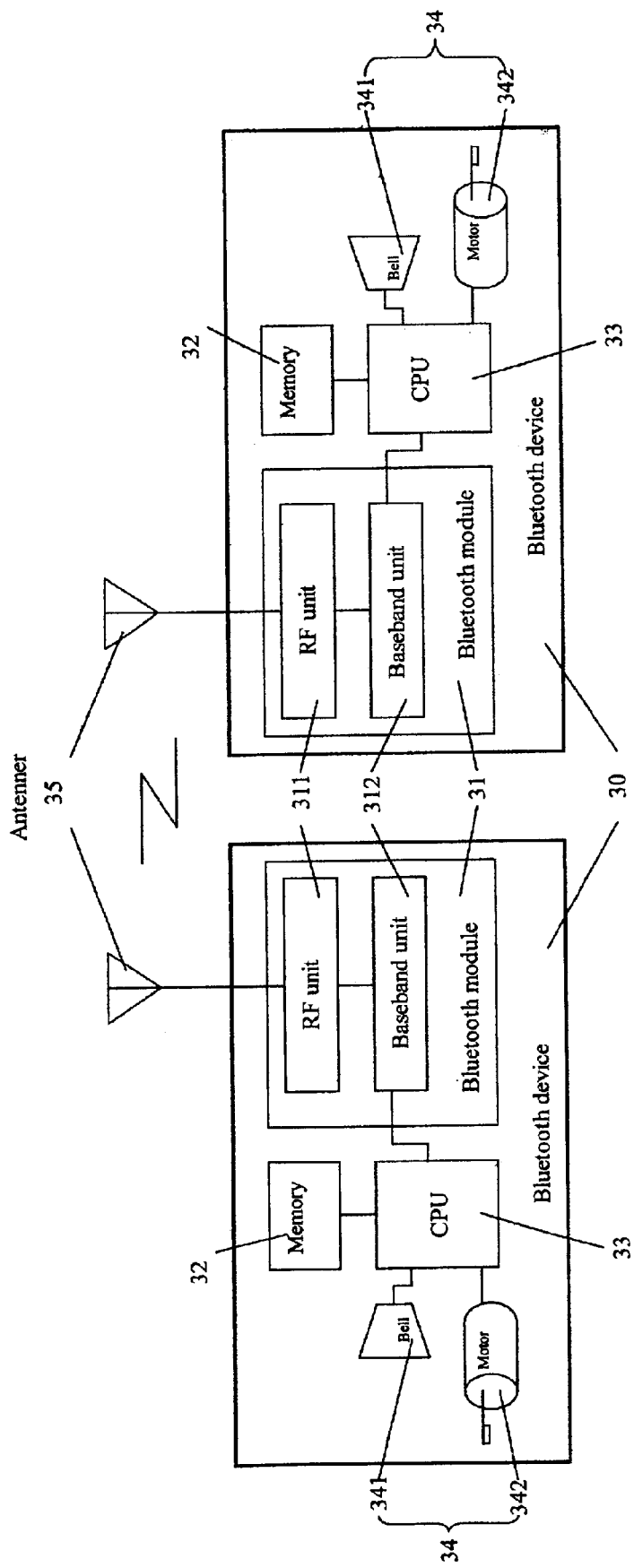
FIG. 3 is a schematic diagram of circuits used in a bluetooth device according to the present invention.

Finally, please refer to FIG. 3. The figure shows a connection build-up between two bluetooth devices. As the figure shows, a general bluetooth device 30 comprises a bluetooth module 31, memory 32 and CPU 33; the bluetooth module 31 further comprises a RF unit 311 and baseband unit 312, and connects with an antenna 35. Sending out and receiving commands through the CPU 33, bluetooth module 31 and link between the antennas 35 build the connection between two bluetooth devices, it is well known to persons skilled in the art. However, a warning device 34, such as a ring bell 341, vibration motor 342 and etc, is further installed in the bluetooth device according to the invention. Thereby, the warning effect of the abnormal connection of bluetooth devices can be attained.

The logic concept and coordinating circuits in the method mentioned above can be understood easily by the person skilled in the art, and they are not the stress point of the invention, the detailed description about them is omitted here.

The method disclosed in the invention can get link quality value periodically in order to send out warning messages to mention users when an abnormal connection between bluetooth devices is happened, so that the disconnection probability of bluetooth devices can be lowered, therefore, it is efficient. And that HCI command is used to get link quality value is not found in other inventions, it is novelty.

It is noted that the method for warning abnormal connection between two bluetooth devices described above are the preferred embodiments of the present invention for the purpose of illustration only, and are not intended as a definition of the limits and scope of the invention disclosed. Any modifications and variations that may be apparent to a person skilled in the art are intended to be included within the scope of the present invention.

What is claimed is:

1. A method for warning an abnormal connection between two bluetooth devices while a connection is built therebetween, comprising the steps of:

adjusting a distance between the two bluetooth devices;

causing a CPU of one of the two bluetooth devices to take an average value obtained by several quality testing values read at the distance as a comparison value;

getting a link quality value and comparing the link quality value with the comparison value to confirm a connection situation between the two bluetooth devices by the respective CPU; and causing the CPU of one of the two bluetooth devices to send out a warning message when an abnormal connection is detected upon carrying out the step of comparing the link quality value with the comparison value.

2. The method of claim 1, further including the step of periodically repeating the step of getting and comparing the link quality values.

3. The method of claim 1, wherein the abnormal connection is detected if the link quality value is lower than the comparison value set by said device.

4. The method of claim 1, wherein the warning message includes vibration, bell ringing or screen displaying.

5. The method of claim 1, further including the step of causing the CPU to stop sending Out the warning message when the abnormal connection is no longer detected.

6. The method of claim 5, wherein the warning message is discontinued after the quality value recovers to be higher than the comparison value set by said device.

7. The method of claim 1, further including the steps of substituting a preset predetermined maximum value, which is set in the CPU of the respective one of the two bluetooth devices in advance, for the comparison value, if the comparison value is larger than the predetermined maximum present value.

8. The method of claim 1, wherein the distance is expected to be the farthest distance between the two connected bluetooth devices that a user expects to be warned.

9. The method of claim 8, further comprising the steps of substituting a predetermined maximum value, which is set in the CPU of the respective one of the two bluetooth devices in advance, for the comparison value, if the comparison value is larger than the predetermined maximum value.

* * * * *